(12) United States Patent
Solntsev et al.

(10) Patent No.: US 7,730,728 B2
(45) Date of Patent: Jun. 8, 2010

(54) SYSTEM AND METHOD FOR COOLING A THERMALLY LOADED DEVICE ON BOARD AN AIRCRAFT

(75) Inventors: Alexander Solntsev, Hamburg (DE); Holger Bammann, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 391 days.

(21) Appl. No.: 11/956,763

(22) Filed: Dec. 14, 2007

(65) Prior Publication Data

US 2008/0148747 A1 Jun. 26, 2008

Related U.S. Application Data

(60) Provisional application No. 60/871,168, filed on Dec. 21, 2006, provisional application No. 60/939,633, filed on May 23, 2007.

(30) Foreign Application Priority Data

Dec. 21, 2006 (DE) .................. 10 2006 060 765
May 22, 2007 (DE) .................. 10 2007 023 685

(51) Int. Cl.
*F25D 9/00* (2006.01)
(52) U.S. Cl. .................. 62/89; 62/244; 62/401; 244/53 R
(58) Field of Classification Search .............. 62/89, 62/239–244, 401, 404–429; 244/53 R, 53 A, 244/118.5
See application file for complete search history.

(56) References Cited

U.S. PATENT DOCUMENTS

| 3,752,422 | A | * | 8/1973 | Runnels et al. .......... 244/118.5 |
| RE32,100 | E | * | 4/1986 | Rannenberg .............. 62/80 |
| 5,491,979 | A | * | 2/1996 | Kull et al. ............... 62/185 |
| 6,127,758 | A | * | 10/2000 | Murry et al. ............. 310/168 |
| 6,460,353 | B2 | * | 10/2002 | Udobot et al. ........... 62/86 |
| 7,069,731 | B2 | * | 7/2006 | Hunt ..................... 62/89 |
| 7,305,842 | B1 | * | 12/2007 | Schiff .................... 62/244 |
| 7,334,423 | B2 | * | 2/2008 | Bruno et al. ............ 62/402 |
| 2005/0126517 | A1 | * | 6/2005 | Piccirilli et al. ......... 123/41.09 |

FOREIGN PATENT DOCUMENTS

| EP | 1695910 | 8/2006 |
| GB | 2166542 | 5/1986 |

* cited by examiner

*Primary Examiner*—William E Tapolcai
(74) *Attorney, Agent, or Firm*—Wood, Herron & Evans, LLP

(57) ABSTRACT

A system (10) for cooling a thermally loaded device on board an aircraft comprises a distribution line (12) which is in communication with an installation space (14) of the thermally loaded device, a coolant supply line (20) which is in communication with a coolant source, and a heat removal line (28) which is in communication with a source of pressure below atmospheric pressure. A shut-off control device (34) is adapted so as, in a first position, to separate the distribution line (12) from the coolant supply line (20) and connect the distribution line (12) to the heat removal line (28) and, in a second position, to connect the distribution line (12) to the coolant supply line (20) and separate the distribution line (12) from the heat removal line (28).

7 Claims, 2 Drawing Sheets

SYSTEM AND METHOD FOR COOLING A THERMALLY LOADED DEVICE ON BOARD AN AIRCRAFT

Figure 1:
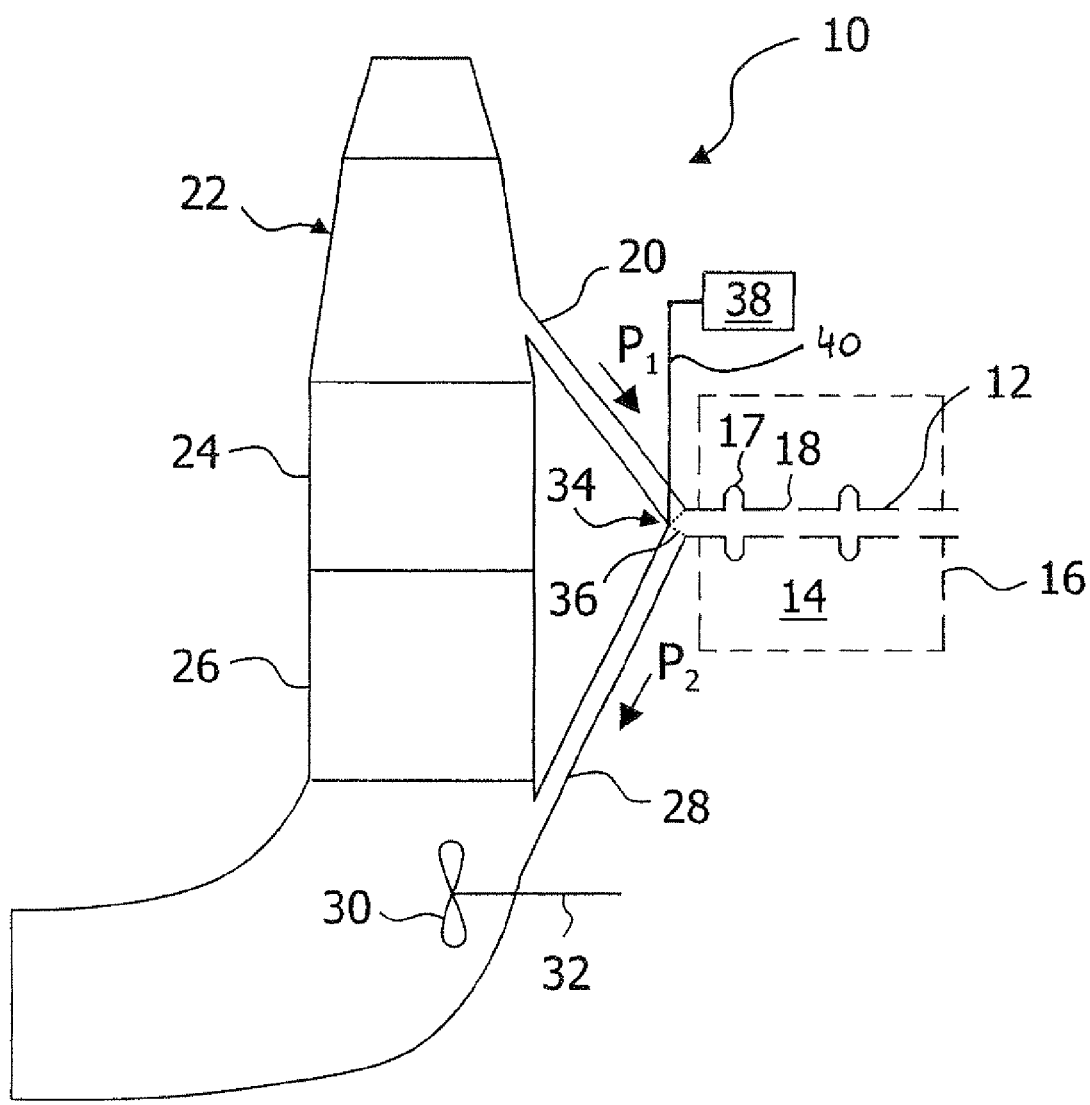

This application claims priority to the filing dates of U.S. Provisional Patent Application No. 60/871,168, filed on Dec. 21, 2006; U.S. Provisional Patent Application No. 60/939,633, filed on May 23, 2007; German Patent Application No. 10 2006 060765.1, filed on Dec. 21, 2006; and German Patent Application No. 102007023685.0, filed on May 22, 2007.

The present invention relates to a system and a method for cooling a thermally loaded device on board an aircraft.

On board an aircraft many different technical devices are provided, which generate heat and which have to be cooled in order to guarantee a reliable mode of operation. These technical devices include for example the air-conditioning units or the electronic control components of the aircraft. In regions of the aircraft, in which such heat-generating devices are disposed, the exceeding of a predetermined temperature and the development of heat accumulation therefore have to be reliably prevented during operation of the aircraft both on the ground and in flight.

The present invention is directed to the object to provide a system and a method that enable reliable and energy-efficient cooling of a thermally loaded device on board an aircraft during operation of the aircraft both on the ground and in flight.

To achieve this object, a system according to the invention for cooling a thermally loaded device on board an aircraft comprises a distribution line which is in communication with an installation space of the thermally loaded device. The system further comprises a coolant supply line, which is in communication with a coolant source, and a heat removal line, which is in communication with a source of pressure below atmospheric pressure. A shut-off control device of the cooling system according to the invention is adapted so as, in a first position, to separate the distribution line from the coolant supply line and connect the distribution line to the heat removal line. In a second position, on the other hand, the shut-off control device is adapted so as to connect the distribution line to the coolant supply line and separate the distribution line from the heat removal line.

During operation of the aircraft on the ground, the shut-off control device may therefore be moved into its first position, in which it connects the distribution line to the heat removal line and consequently to the source of pressure below atmospheric pressure that is connected to the heat removal line. Thus, the waste heat of the thermally loaded device may be reliably removed from the thermally loaded device via the distribution line and the heat removal line. During operation of the aircraft in flight, i.e. preferably on completion of the take-off phase, on the other hand, the shut-off control device may be moved into its second position, in which it connects the distribution line to the coolant supply line and separates the distribution line from the heat removal line. As a result, during operation of the aircraft in flight the thermally loaded device may be supplied with coolant via the distribution line and the coolant supply line.

The cooling system according to the invention enables reliable cooling of the thermally loaded device during operation of the aircraft both on the ground and in flight. The system moreover provides a forced circulation of the coolant in the region of the thermally loaded device, thereby reliably preventing the development of heat accumulation in the region of the thermally loaded device. The cooling system according to the invention is therefore particularly suitable for use in cooling safety-relevant components on board the aircraft. For example, the system according to the invention may be used advantageously to cool the pack bay.

The coolant supply line of the system according to the invention for cooling a thermally loaded device on board an aircraft is preferably connected to a ram air source. The ram air is then used as a coolant to cool the thermally loaded device. To supply the ram air to the thermally loaded device via the coolant supply line and the distribution line, it is advantageously possible to use the pressure above atmospheric pressure of the ram air. Provided that the ram air source provides sufficient dynamic pressure to feed the ram air through the coolant supply line and the distribution line to the thermally loaded device, it is therefore possible to dispense with an additional feed device.

In a preferred embodiment of the system according to the invention for cooling a thermally loaded device on board an aircraft, the coolant supply line is connected to a region of a ram-air channel, which is in any case provided on board the aircraft and to which a pressure above atmospheric pressure is applied. Such a structural design of the cooling system according to the invention is possible in all cases where during operation of the aircraft in flight, i.e. after the take-off phase, the pressure above atmospheric pressure in the ram-air channel is high enough to guarantee proper functioning of the cooling system.

As an alternative to this it is however also possible to connect the coolant supply line to an additional ram-air channel and/or an additional NACA (National Advisory Committee for Aeronautics) inlet. Such an additional ram-air channel and/or NACA inlet may, in terms of its structural design, be adapted in such a way to the requirements arising during operation of the cooling system according to the invention that during operation of the aircraft in flight, i.e. after the take-off phase, there is always an adequate pressure above atmospheric pressure applied to the coolant supply line to guarantee a proper supply of coolant to the thermally loaded device.

Particularly if the coolant supply line is connected to a ram-air channel that is in any case provided in the aircraft, it is advantageous to connect the coolant supply line to the ram-air channel upstream of heat exchangers disposed in the ram-air channel. In this region of the ram-air channel there is usually a high enough pressure above atmospheric pressure to guarantee proper functioning of the cooling system according to the invention during operation of the aircraft in flight, i.e. after the take-off phase.

The heat removal line of the cooling system according to the invention, on the other hand, is preferably connected to a region of the ram-air channel to which a pressure below atmospheric pressure is applied. The pressure below atmospheric pressure prevailing in the ram-air channel may then be used during operation of the aircraft on the ground to remove heat, i.e. air that has been heated by the waste heat of the thermally loaded device, from the thermally loaded device. Provided that the pressure below atmospheric pressure prevailing in the ram-air channel is sufficient to guarantee a proper removal of heat from the thermally loaded device, it is therefore also possible to dispense with an additional feed device for removing the heat and/or the heated air via the distribution line and the heat removal line. The forced circulation of the air in the region of the thermally loaded device may therefore be realized completely without additional external energy sources. This enables a particularly energy-efficient operation of the cooling system according to the invention.

The heat removal line is preferably connected to the ram-air channel upstream of a fan disposed in the ram-air channel.

The fan may be for example the fan of the ACM (air cycle machine), which is conventionally powerful enough to provide the pressure below atmospheric pressure that is needed for proper functioning of the cooling system according to the invention. As an alternative to this, however, a separate pneumatically operated or electrically operated fan may be disposed in the ram-air channel.

The heat removal line is moreover preferably connected to the ram-air channel downstream of the heat exchangers disposed in the ram-air channel. It is thereby possible to ensure that the heat exchangers are not loaded with the waste heat removed from the thermally loaded device via the heat removal line.

The shut-off control device of the cooling system according to the invention preferably comprises an adjustable flap that is adapted so as, in the first position of the shut-off control device, to block the coolant supply line and clear the heat removal line. The adjustable flap may further be adapted so as, in the second position of the shut-off control device, to clear the coolant supply line and block the heat removal line. Such a structural design of the shut-off control device is relatively simple and economical to realize and moreover guarantees a high degree of operational reliability. As an alternative to this, however, other designs of the shut-off control device, for example in the form of a solenoid valve or the like, are conceivable.

Control of the shut-off control device is effected preferably by means of an electronic control unit. The electronic control unit may be adapted so as to receive from various detection devices signals that indicate the operating state of the aircraft. The electronic control unit may therefore control the shut-off control device in dependence upon the operating state of the aircraft and for example initiate a movement of the shut-off control device from its first position to its second position when the signals supplied by the detection devices to the electronic control unit indicate that the take-off phase of a flight is concluded and the aircraft is situated at the desired cruising altitude.

In the distribution line of the cooling system according to the invention openings and/or nozzles are preferably formed for connecting the distribution line to the installation space of the thermally loaded device. For example, the removal of heat, i.e. the removal of air heated by the waste heat of the thermally loaded device from the thermally loaded device may be effected through openings formed in the distribution line. The supply of coolant, on the other hand, may be realized in a particularly efficient manner by means of nozzles formed in the distribution line. In other words, during operation of the aircraft on the ground, hot air and hence waste heat from the thermally loaded device may be extracted through the openings provided in the distribution line. During operation of the aircraft in flight, i.e. after the take-off phase, on the other hand, cooling air may be blown towards the thermally loaded device through the nozzles provided in the distribution line.

A method according to the invention for cooling a thermally loaded device on board an aircraft comprises the step of moving a shut-off control device into a first position in order during operation of the aircraft on the ground to separate a distribution line, which is connected to an installation space of the thermally loaded device, from a coolant supply line, which is connected to a coolant source, and to connect the distribution line to a heat removal line connected to a source of pressure below atmospheric pressure. The method according to the invention further comprises the step of moving the shut-off control device into a second position in order during operation of the aircraft in flight to connect the distribution line, which is connected to the installation space of the thermally loaded device, to the coolant supply line, which is connected to the coolant source, and to separate the distribution line from is the heat removal line connected to the source of pressure below atmospheric pressure.

Preferably, the shut-off control device during operation of the aircraft in flight on completion of the take-off phase is moved from its first position into its second position.

A preferred embodiment of the system according to the invention and of the method according to the invention for cooling a thermally loaded device on board an aircraft is now described in detail with reference to the accompanying diagrammatic figures, which show FIG. 1 a system according to the invention for cooling a thermally loaded device on board an aircraft, FIG. 2*a* an enlarged view of a shut-off control device of the cooling system illustrated in FIG. 1 in its first position and FIG. 2*b* an enlarged view of the shut-off control device of the cooling system illustrated in FIG. 1 in its second position.

A cooling system 10 represented in FIG. 1 and intended for use on board an aircraft comprises a distribution line 12, which is in communication with the pack bay 14 of the aircraft. To connect the distribution line 12 to the pack bay 14, nozzles 17 and openings 18 are formed in the distribution line 12.

The cooling system 10 further comprises a coolant supply line 20. A first end of the coolant supply line 20 is connected to a diffuser portion of a ram-air channel 22 and consequently to a region of the ram-air channel 22 to which a pressure above atmospheric pressure is applied. The region of the ram-air channel 22 to which a pressure above atmospheric pressure is applied is situated upstream of heat exchangers 24, 26 disposed in the ram-air channel 22.

Finally, the cooling system 10 comprises a heat removal line 28. A first end of the heat removal line 28 is connected to a region of the ram-air channel 22 to which a pressure below atmospheric pressure is applied. The region of the ram-air channel 22 to which a pressure below atmospheric pressure is applied lies upstream of a fan 30 disposed in the ram-air channel 22 and downstream of the heat exchangers 24, 26 disposed in the ram-air channel 22. The fan 30 is connected to a shaft 32 of the ACM of an air-conditioning unit.

Second ends of the coolant supply line 20 and of the heat removal line 28 each are connectable to the distribution line 12 and/or separable from the distribution line 12 by means of a shut-off control device 34. The shut-off control device 34 comprises an adjustable flap 36, which is represented by dashed lines in FIG. 1.

Control of the shut-off control device 34 is effected by means of an electronic control unit 38, which is connected by a line 40 to the shut-off control device 34. The electronic control device 38 receives from various sensors signals indicating the operating state of the aircraft. The shut-off control device 34 may consequently be controlled by the electronic control unit 38 in dependence upon the operating state of the aircraft.

Figure 2A:
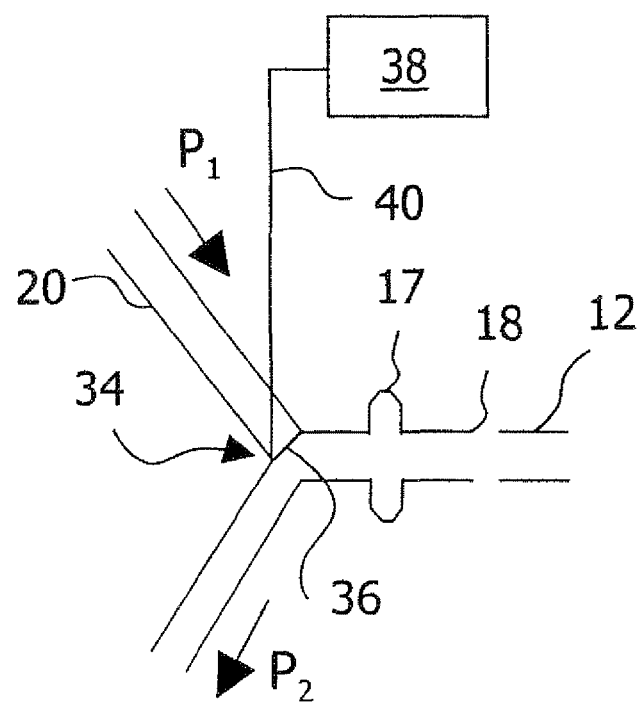
Figure 2B:
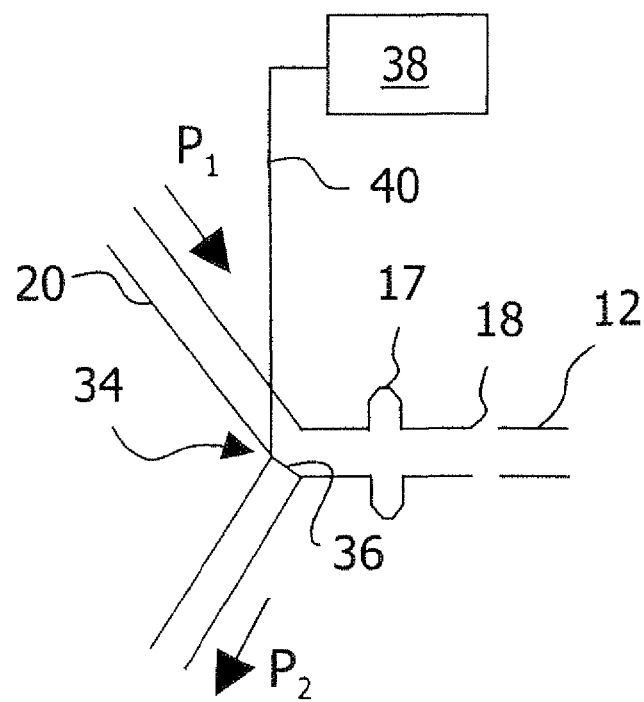

As is evident in particular from FIGS. 2*a* and 2*b*, the shut-off control device 34 is adjustable between a first and a second position. In the first position of the shut-off control device 34 shown in FIG. 2*a*, the flap 36 blocks the coolant supply line 20 and clears the heat removal line 28. In the second position of the shut-off control device 34 shown in FIG. 2*b*, on the other hand, the flap 36 clears the coolant supply line 20 and blocks the heat removal line 28. In other words, in its first position the shut-off control device 34 separates the distribution line 12 from the coolant supply line 20 and connects the distribution line 12 to the heat removal line 28. In its second position, on the other hand, the shut-off control device 34 connects the distribution line 12 to the coolant supply line 20 and separates the distribution line 12 from the heat removal line 28.

There now follows a description of the mode of operation of the cooling system 10. During operation of the aircraft on the ground the electronic control unit 38 moves the shut-off control device 34 into its first position, in which the flap 36 connects the distribution line 12 to the heat removal line 28. The coolant supply line 20, on the other hand, is blocked so that the connection between the distribution line 12 and the coolant supply line 20 is interrupted.

By means of the fan 30 of the ACM a pressure below atmospheric pressure is generated in the region of the ram-air channel 22 lying upstream of the fan 30. As a result of the pressure below atmospheric pressure, hot air is extracted from the pack bay 14 through the openings 18 formed in the distribution line 12. The removal of heat is effected via the distribution line 12 and the heat removal line 28 in the direction of the arrow $P_2$. The fact that the first end of the heat removal line 28 is connected to the ram-air channel 22 downstream of the heat exchangers 24, 26 ensures that the heat exchangers 24, 26 are not loaded with the waste heat removed from the pack bay 14.

During operation of the aircraft in flight, the shut-off control device 34 is initially left in its first position during the take-off phase. In this phase, the cooling of the pack bay 14 is therefore still effected by heat removal through the distribution line 12 and the heat removal line 28.

It is only when the electronic control unit 38 receives from the sensors of the aircraft appropriate signals indicating the conclusion of the take-off phase that the electronic control unit 38 moves the shut-off control device 34 into its second position. In the second position of the shut-off control device 34, the flap 36 blocks the heat removal line 28 and clears the coolant supply line 20, with the result that the distribution line 12 is connected to the coolant supply line 20 and separated from the heat removal line 28.

On conclusion of the take-off phase, i.e. once the aircraft has reached the desired cruising altitude, a sufficiently high pressure above atmospheric pressure is applied to the region of the ram-air channel 22 lying upstream of the heat exchangers 24, 26. Consequently, ram air is conducted in the direction of the arrow $P_1$ through the coolant supply line 20 and the distribution line 12. The ram air is blown into the pack bay 14 through the nozzles 17 provided in the distribution line 12. Thus, proper cooling of the pack bay 14 is guaranteed also during operation of the aircraft in flight.

The invention claimed is:

1. System (10) for cooling a thermally loaded device on board an aircraft, comprising
   a distribution line (12) which is in communication with an installation space (14) of the thermally loaded device,
   a coolant supply line (20) which is in communication with a coolant source,
   a heat removal line (28) which is in communication with a source of pressure below atmospheric pressure, and
   a shut-off control device (34) which is adapted so as, in a first position, to separate the distribution line (12) from the coolant supply line (20) and connect the distribution line (12) to the heat removal line (28) and, in a second position, to connect the distribution line (12) to the coolant supply line (20) and separate the distribution line (12) from the heat removal line (28), characterized in that the coolant supply line (20) is connected to a region of a ram-air channel (22) to which a pressure above atmospheric pressure is applied, and in that the heat removal line (28) is connected to a region of the ram-air channel (22) to which a pressure below atmospheric pressure is applied.

2. Cooling system according to claim 1, characterized in that the coolant supply line (20) is connected to the ram-air channel (22) upstream of heat exchangers (24, 26) disposed in the ram-air channel (22).

3. Cooling system according to claim 1, characterized in that the heat removal line (28) is connected to the ram-air channel (22) upstream of a fan (30) disposed in the ram-air channel (22) and downstream of the heat exchangers (24, 26) disposed in the ram-air channel (22).

4. Cooling system according to claim 1, characterized in that the shut-off control device (34) comprises an adjustable flap (36), which is adapted so as, in the first position of the shut-off control device (34), to block the coolant supply line (20) and clear the heat removal line (28) and, in the second position of the shut-off control device (34), to clear the coolant supply line (20) and block the heat removal line (28).

5. Cooling system according to claim 1, characterized in that in the distribution line (12) openings (18) and/or nozzles (17) are formed for connecting the distribution line (12) to the installation space (14) of the thermally loaded device.

6. Method for cooling a thermally loaded device on board an aircraft, comprising the steps
   moving the shut-off control device (34) of a system according to one of claims 1 to 5 into a first position in order during operation of the aircraft on the ground to separate the distribution line (12) from the coolant supply line (20) and to connect the distribution line (12) to the heat removal line (28), and
   moving the shut-off control device (34) into a second position in order during operation of the aircraft in flight to connect the distribution line (12) to the coolant supply line (20) and to separate the distribution line (12) from the heat removal line (28).

7. Method according to claim 6, characterized in that the shut-off control device (34) during operation of the aircraft in flight on conclusion of the take-off phase is moved from its first position into its second position.

* * * * *